Sept. 23, 1969 G. F. JONAS 3,467,976

METHOD OF STIFFENING SELECTED AREAS OF APPAREL COMPONENTS

Filed Feb. 18, 1966 5 Sheets-Sheet 1

Inventor
GILBERT F. JONAS
By John H. [signature]
Attorney

METHOD OF STIFFENING SELECTED AREAS OF APPAREL COMPONENTS

United States Patent Office 3,467,976

Patented Sept. 23, 1969

3,467,976

METHOD OF STIFFENING SELECTED AREAS OF APPAREL COMPONENTS

Gilbert F. Jonas, Nashville, Tenn., assignor to Genesco, Inc., Nashville, Tenn., a corporation of Tennessee Filed Feb. 18, 1966, Ser. No. 528,619
Int. Cl. A43d *7/02;* A43b *13/42;* A43c *13/14*
U.S. Cl. 12—146 12 Claims

ABSTRACT OF THE DISCLOSURE

Improving the physical properties of selected areas of porous apparel parts by applying to the selected parts an integument of thermo-softenable plastic under heat sufficient to render it flowable, and pressing it into the pores of the apparel material whereby to mechanically interlock the integument with the porous material.

This invention relates generally to the manufacture of apparel, and particularly to the stiffening and reinforcing of selected areas in apparel without producing unwanted stiffness or bulk in adjacent areas.

In the design and engineering of apparel, the starting point is usually selection of material which has the needed "hand," drape, appearance and, most importantly, feel or comfort around the areas of the body which move, flex, and in other ways change in contour, which the article of apparel must follow. Starting with a single material or layers of material, it then becomes necessary to selectively stiffen or reinforce, in order that the final article of apparel will be able to retain shape, control outline, apply pressure for position retention, and sometimes modify the selected material to have different physical characteristics at different places.

Such modification of the base material or materials must be done in a manner which will not cause irritation or discomfort to the ultimate wearer. The stiffening and reinforcing means should have the ability to move and change within the limits called for by the portions of the anatomy which they cover, and upon which they exert pressure and apply control. Furthermore, they must have the property of continuing their intended function, even though they may be exposed to continuous exertion of forces, which will temporarily deform them.

Finally, aesthetically, such reinforcing and stiffening components should perform their function without being conspicuous, or they must adorn and protect as well. In other words, they cannot show through the base material or modify the appearance of the base material so that their presence is revealed, unless this is done attractively. Neither can their presence be disclosed negatively by failing to do the job for which they were included in the apparel items; failing by premature deterioration, breaking or changing under conditions of normal wear, cleaning, laundry and exposure to body chemicals.

For the desiderata mentioned, it is easy to understand why there is such great variety in the materials used for this purpose. Furthermore, it is easy to see how these materials, even though they are not visible generally, can be an important factor in the cost of the finished goods, both from the cost of the material and from the cost of labor in forming and applying. The useable materials are so numerous, and methods of application so varied, that selection and engineering of them into a product is an art in itself. They are so many and varied that the problem of inventory control is a serious one with manufacturers.

Heretofore, such stiffening and reinforcing has been achieved by applying separate materials which has the approximate qualities needed, by adhesives, either through application of the adhesives in liquid form, or by precoating the stiffening materials with a heat activated adhesive and pressing the parts onto the base material. In many cases, they were left floating between two layers of other materials in "pockets" designed to hold them in position. Another sometimes used method is to apply liquids directly to the cellular, fiber materials obtaining stiffening by filling the pores with a more rigid substance. These fillers are usually natural or synthetic resins in solution or suspension. These methods were used infrequently because the solutions contain very little solids, and are inclined to be irregular in the quantity applied because of the varying absorption abilities of the material to which they were added, difficulty of controlling the areas to which they are applied and tendencies to strike through the base materials, discoloring or affecting the surface.

It is therefore the object of this invention to provide apparel with the needed stiffening, reinforcing, decorating and protecting in selected areas by means of a simpler technique and with more satisfactory results than have heretofore been provided.

Most of the basic materials used in apparel today are fibrous in nature; that is, there is a substantial part of the material that is interstitial or otherwise porous in structure. Typical, and by far the most frequently used, are textiles, leather, felts, and synthetic materials which are designed to have physical properties comparable or better than the natural counterparts. Such porosity normally extends throughout any given piece of basic apparel material, and the present invention contemplates utilizing such porosity or interstitiality for differentiating the stiffness and strength of selected localized areas. Thus, in selected areas where shape retention and stiffness are required, the fibers are bound and pores charged with material which induces such qualities, while in the areas where great flexibility is desired, the cellular or fiber structure remains in its comparatively soft or loose state.

Thus, in preselected areas of a piece of material, a binding agent is introduced so that the fibers are bound together in controllable degree, adding whatever quality is needed to the base material, changing the materials only as, where, and in the degree they are needed to be changed for the particular purpose intended. While such binding action essentially occurs within and between the fibers themselves with a controlled amount of penetration, where desired, an excess of binding agent may remain outside the material. The binding agent is essentially a plastic material which is thermo-sensitive (i.e., one whose plasticity can be readily controlled, or its state of matter changed, by the addition or subtraction of heat) and which, in its final condition, has the properties of resiliency, durability, compatibility with human anatomy and convenient workability under the conditions of apparel manufacture; and the invention is characterized by the feature that the binding agent be manipulated as a solid integument which is fluidized in situ upon the area selected for treatment.

In the accompanying drawings, the invention is illustrated in connection with the manufacture of shoes and shoe parts, and while a number of modifications and variations of materials and procedures are illustrated, it is not to be understood that the invention is limited to the particular forms illustrated in the drawings, or that it is limited to shoes, or even to articles made of leather or leather-like materials in contrast to apparel at large.

Figure 1:
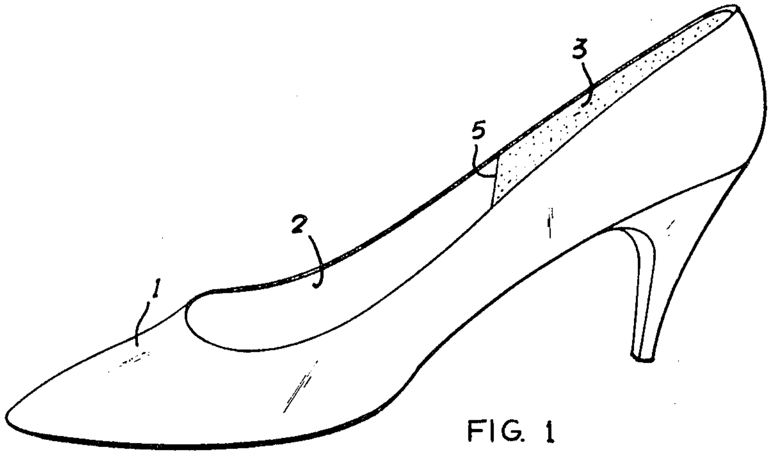
FIGURE 1 is a perspective view of a typical woman's pump, the upper of which is stiffened and reinforced in selected areas in accordance with the present invention.

As hereinbefore indicated, the invention contemplates the application to basic apparel materials of integuments of solid heat-softenable materials which may, by heat and pressure, be integrated with the basic material to impart desired physical properties to the composite product. The solid integuments are peripherally shaped, as by cutting, to correspond substantially with the area of the shoe, or other apparel, to be reinforced or stiffened or rendered more resistant or resilient thereby; and are applied at the selected location on the basic apparel material by heating the heat-softenable integument either prior to its disposition upon the basic apparel material or in situ thereon, to an extent sufficient to render the integument material flowable into the pores or interstices of the basic apparel material when subjected to mechanical pressure. Thus the heat-softenable materials contemplated include those which are, in the parlance of the plastics art, termed "thermoplastics," as well as those which are, in such parlance, termed "thermosets," provided the latter are in their "B-stage" because, in that stage, they soften by the addition of heat, but ultimately, when enough heat has been added, cross-linking occurs, and at full cure an irreversible solidification has taken place.

Typical of the useful B-stage heat-softenable so-called "thermosets" are acrylic, polyester, polyesterurethane, and polyamide resins which are available in sheet form and are resilient after irreversible solidification, and may be with or without elastomeric properties depending upon their composition. For example, where the property sought is scuff-resistance, the material may be a vulcanizable fluorinated acrylic; where the property sought is stiffness, vulcanizable acrylate-acrylonitrile copolymers may be use.

Typical solid thermoplastic elastomers which are useful for making the integuments of the present invention are polyester urethane, ethylene-vinyl acetate copolymers, ethylene-methyl-methacrylate copolymer, and styrene-butadiene copolymer. These are thermoplastics which exhibit elastomeric properties, and may be manufactured in sheets as thin as one thousandth of an inch, and their softening temperatures are such that they may be caused to flow into the pores or interstices of basic apparel materials without elevating their temperature above levels which might have a deleterious effect upon the basic apparel materials. The aforesaid thermoplastic elastomers are preferable, but other thermoplastic elastomers, having some or all of the above-mentioned properties, but, in any event, having the property of being reducible to sheet form in the solid state, may be employed. Among the thermoplastic elastomers mentioned, however, that which has been found most universally adaptable in apparel manufacture is the copolymer ethylene-vinyl acetate, and unless otherwise indicated, the reference hereinafter to thermoplastic integument has reference to ethylene-vinyl acetate in solid form. Such a material, supplied in sheets having a thickness of from one to sixty thousandths of an inch, may be readily cut to the desired shapes for application to leather, textile, or other common apparel material, and applied thereto by heat and pressure which causes the thermoplastic to flow into and establish radiciform anchorage within the interstices or other pores of the basic material, and there solidified in situ. Either concurrently with, or subsequent to, such unification of the thermoplastic integument with the basic apparel material, the resulting laminate may be elevated to a temperature in excess of the basic memory point of the thermoplastic and then reset into the contour desired in the finished article of apparel, all without substantially diminishing the elastomeric properties of the integument, but nevertheless conditioning it to return to the contour in which it was reset after being flexed out of that contour.

Figure 2:
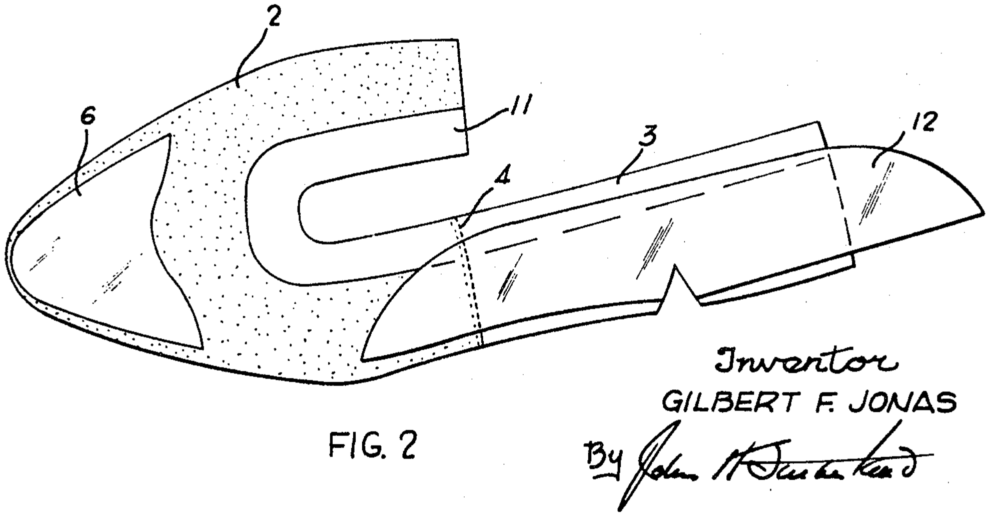
FIGURE 2 is a plan view of the internal upper components (i.e., exclusive of the outside upper) fully assembled but not closed, and suitable for use in the shoe shown in FIGURE 1.
Figure 9:
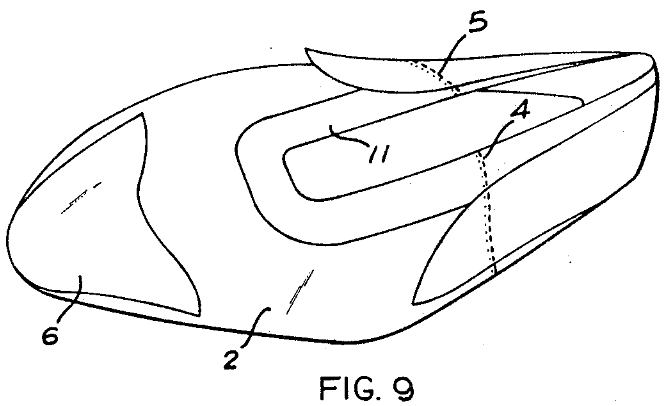
FIGURE 9 is a perspective view of the shoe lining shown in FIGURE 2 after closing, and after the several integuments have been unified therewith.

The shoe shown in FIGURE 1 may have a conventional outside upper 1 of leather, leather-like, or appropriate textile material, and is provided with a vamp lining 2, and a double quarter lining 3, which are assembled together by appropriate seams 4 and 5 at the sides of the shoe. With the vamp lining 2 and double quarter lining 3 assembled together by seam 4 as shown in FIGURE 2, there is applied to the fore part of the vamp lining a thermoplastic integument 6, which is cut out of a sheet of such thermoplastic material to the peripheral contour shown in FIGURES 2 and 3, which corresponds generally to the peripheral contour of a conventional box toe blank, and may, if desired (particularly when it is to be used with lightweight leather as the basic or foundation material) be skived along its rear margin 7 to gradually reduce the thickness of the integument toward its rear edge. The integument 6, which forms the box toe, is preferably cut from thermoplastic material having a thickness of about twenty thousandths of an inch. Such as integument 6 may be properly positioned on vamp lining 2, and while so positioned, introduced into a press, such as that shown in FIGURE 6.

Figure 6:
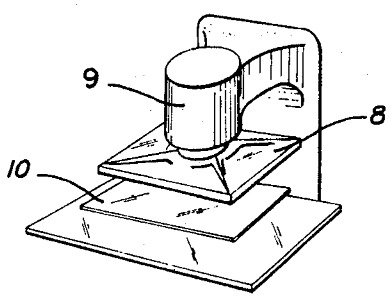
FIGURE 6 is a perspective view of a pressing apparatus suitable for use in applying the integuments of FIGURES 3, 4 and 5 to basic shoe components, such as an outside upper part or a lining part.

The press shown in FIGURE 6 has a movable head plate 8 equipped with means for heating it to a temperature sufficient to soften the thermoplastic integuments, and with means, such as a fluid pressure cylinder 9, for applying thereto a force sufficient to develop the desired pressure between movable head plate 8 and stationary base plate 10.

Figure 7:
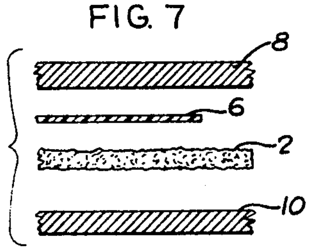
FIGURE 7 is an exploded view showing in section the relationship of integument, basic shoe component, and press parts for applying the integument to the basic shoe part.
Figure 8:
FIGURE 8 is a sectional view showing the unified integument and basic shoe part resulting from the pressing operation illustrated (in exploded fashion) in FIGURE 7.

The parts 2 and 6, in appropriate relative position, are placed between the plates 8 and 10 of the press in the relationship shown in FIGURE 7, and when the temperature of plate 8 has been maintained for a sufficient time at a sufficiently high value to render the integument 6 flowable, a sufficient force is applied in the hydraulic cylinder 9 to press the integument against the surface of vamp lining 2 with sufficient pressure to drive the flowable thermoplastic of the integument into the interstices and pores of the vamp lining 2 in the manner illustrated generally in FIGURE 8, it being understood, however, that while, as shown in FIGURE 8, the integument 6 has assumed an irregular lower profile, the illustration does not connote displacement of the basic material, but rather migration of the fluidized thermoplastic into the interstices and pores of the basic material. In other words, the increase in thickness of the integument 6 as between FIGURES 7 and 8 is more apparent than real, because much of the cross-hatched area in FIGURE 8 is in fact occupied by the solids of vamp lining 2. For example, when the integument 6 is made of a copolymer of polyethylene and vinyl acetate and has a thickness of 0.020 inch, the press headplate 8 may be maintained at a temperature of about 300° F., and the parts held pressed together at 100 p.s.i. for a dwell time of about ten seconds to produce unification of the kind shown in FIGURE 8.

The heating and pressing operation just described is preferably carried out in the flat. Comparable heating and pressing operations are employed to unify an integument 11 about the top line of the assembled vamp lining 2 and quarter lining 3, as shown in FIGURE 2. The integument 11, for top line stiffening, can be formed from thermoplastic sheeting thinner than that required for box toe purposes, and, for example, can be cut from the same material as that from which the box toe integument was cut, but of a thickness on the order of about ten thousandths inch.

For use as a counter stiffener, the thermoplastic elastomeric material is preferably on the order of about forty thousandths of an inch thick, and from such material a counter integument 12 may be cut and applied by heat and pressure, as aforesaid, to unify it with the quarter lining 3, as shown in FIGURE 2.

Given the lining with unified integuments as shown in FIGURE 2, the lining is closed by bringing the loose end of quarter lining 3 into adjacence with the loose end of vamp lining 2, and stitching, as at 5, to close the lining. The lining may be assembled in the conventional manner with the outside upper 1 and lasted as usual, but it is preferred that modest heat be applied during the lasting, at least at the areas of the upper where the box toe integument 6 and the counter integument 12 are located. Indeed, it may be desirable to shape the lining and outside upper, together with the integuments intervening, in an appropriate heat forming machine prior to lasting the upper, or if it is desired merely to heat contour the counter integument, such may advantageously be done by heating the back part of the upper after assembly in a steam chest, as commonly provided at lasting machines, so that the counter integument is soft when the upper is pulled over a last and readily conforms to the contour thereof. Where it is desired to correspondingly contour the box toe integument 6, the fore part of the shoe may be so heated prior to the bed lasting operation, In any event, it is preferred that after the shoes are lasted, and while still on the last, they be run through heat setting equipment to finally contour the integuments in conformity to the surface of the last. The combination of moisture and heat, or exposure to dry hot air, not only conforms the upper to the last, but also relieves the stresses in the stiffening integuments, so that the latter take the precise shape of the last and the upper while new plastic memory is imparted to the thermoplastic integuments.

Figure 3:
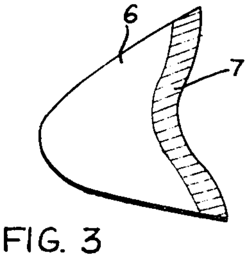
FIGURE 3 is a perspective view of an integument of thermoplastic elastomer so contoured as to adapt it for use as the toe stiffener in the shoe of FIGURE 1.
Figure 4:
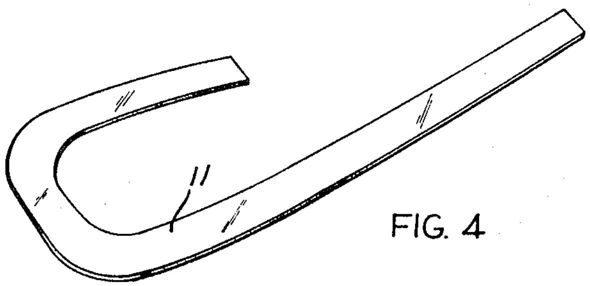
FIGURE 4 is a perspective view of an integument of thermoplastic elastomer so contoured as to adapt it for use as the top line stiffener in the shoe of FIGURE 1.
Figure 5:
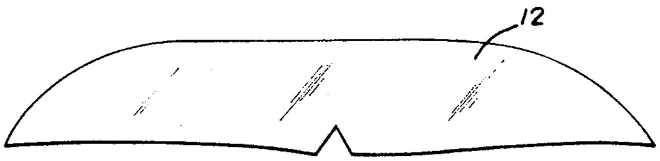
FIGURE 5 is a plan view of an integument of thermoplastic elastomer so contoured as to adapt it for use as the counter stiffener in the shoe of FIGURE 1.

While the parts shown in FIGURES 2 and 3 have been described as a basic lining with stiffening and reinforcing integuments, it may be pointed out that with appropriate heat and pressure techniques, so as to feather the edges of the integuments into smooth merger with the adjacent surface of the foundation material, the parts shown in FIGURES 2 and 3 may, if desired, in wrong-side-out relationship, be utilized as the outside upper of an unlined shoe. Indeed, instead of unifying the several integuments to the lining as above described, they can as well be unified with the oustide upper when the controls now to be described are exercised.

Figure 10:
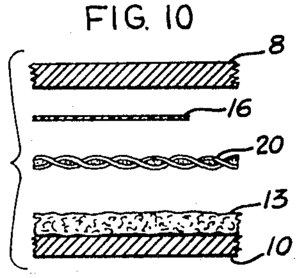
FIGURE 10 is a view corresponding to FIGURE 7, but showing a textile type of basic apparel material, a thinner integument, and a softer press part than is shown in FIGURE 7.
Figure 12:
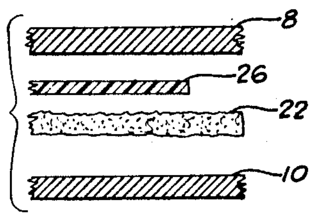
FIGURE 12 is another view corresponding to FIGURES 7 and 10, but illustrating a still different set of conditions with respect to the thickness of the thermoplastic integument and the heft of the leather.
Figure 11:
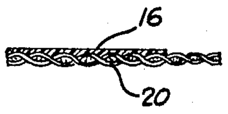
FIGURE 11 is a sectional view corresponding to FIGURE 8, but showing the unified material resulting from the pressing operation illustrated in FIGURE 10.

FIGURES 10 and 12 schematically illustrate, after the fashion shown in FIGURE 7, the results achieved using different base materials from those illustrated in FIGURE 7. As shown in FIGURE 10, the base material 20 is textile fabric, the thermo-sensitive integument 16 is thinner than its counterpart 6 in FIGURE 7, and the base plate 10 is provided with a layer 13 of cushion material interposed between the base plate 10 and the base material 22 during the pressing operation. The provision of the resilient cushion 13 reduces both the degree of penetration and the sidewise creepage of the thermo-sensitive material. The integument 16 may be of the same material as the integument 6 in FIGURE 7, but for use under the conditions illustrated in FIGURE 10, the thickness thereof is preferably reduced to about 0.005 inch, the pressure reduced to about fifty pounds per square inch, and the pad 13 made of material having a softness such that it compresses to about half its thickness under the exerted pressure. When the integument 16 is composed of ethylene-vinyl acetate copolymers, it may be heated (with or without previous preheating) while under pressure in the press, to a temperature of about 300° F., at which temperature it becomes sufficiently fluid to migrate into the interstices of textile fabric 20, at least at the face thereof which is contiguous with integument 16. Under the conditions described, the fluidized integument will penetrate the fabric 20 for a distance not substantially greater than the thickness of the initial integument. Under constant pressure, with the soft pad 13 supporting the load, there is little or no tendency for the fluidized integument to migrate sidewise. The results of such an operation are shown in FIGURE 11, in which it will be observed, by contrast with FIGURE 8, that the fibers of the textile fabric have been somewhat compressed in the area which, during the pressing operation, was overlaid by the integument 16. Under the conditions stated, the fluidized integument material may also be expected to penetrate the inter-fiber interstices of the textile strands from which the fabric is woven, but as shown in FIGURE 11, the volume of integument somewhat assumes the character of a coating on the fabric, and the presence of the soft pad 13, conforming to the irregularities of the surface fabric 20, effectively dams the flow of the softened integument and prevents "strike through." Thus, the area of the fabric affected by the integument, under the conditions described, corresponds substantially with the peripheral contour of the integument 16, i.e., without increase in such area, as was the case with the procedure and result illustrated in FIGURES 7 and 8.

Figure 13:
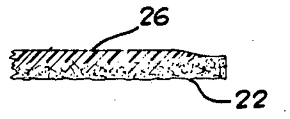
FIGURE 13 is a sectional view showing the unified material resulting from the operation illustrated in FIGURE 12.

FIGURE 12 shows a different set of conditions resulting in the product illustrated in FIGURE 13. Under the conditions shown in FIGURE 12, integument 26 has a thickness on the order of about 0.030 inch, while the base material 22 is comparatively heavy leather, such as side leather of bovine origin. The procedure illustrated in FIGURE 12 results in both stiffening and reinforcing the base material with maximum penetration of and between the fibers in the base material. In this instance, with an integument composed of the ethylene-vinyl acetate copolymers, the plate 8 may be heated to a temperature of about 300° F. and, while so heated, pressed against the integument 26 and the base material 22 while resting on base plate 10 of the press. When subjected to a pressure of about 100 pounds per square inch for a period of about fifteen seconds, the result may be expected to resemble that shown in FIGURE 13. These conditions differ from those of FIGURE 7 only in that the dwell time has been increased in proportion to the thickness of the integument employed, but the difference in the character of the base material produces a difference in result. At higher temperatures, and for longer periods, the integument material will penetrate into the base material 22 until the internal pressures developed within the fibers of the base material are equal to the pressure exerted by the press. Under the conditions described, there will be some compression of the leather fibers, but the thickness of the leather base material 22 is not substantially changed. In this case, in contrast to that shown in FIGURES 10 and 11, sidewise creepage may be expected to occur. Internal pressure within the plies will ultimately equal the external pressure before the press can close to the initial thickness of the leather base material 22 alone. The presence of the impregnated integument material in the fibers of the leather provides increased internal pressure in those regions of the base material which are penetrated by the integument material.

From FIGURES 7, 8, 10, 11, 12, and 13, it can be seen that by changing the parameters of integument thickness, pressure, temperature, dwell time, base material and supporting surface, a wide range of results can be obtained so as to meet the requirements of a variety of conditions called for in the manufacture of apparel of various sorts. Generally stated the greater the pressing pressure, temperature and dwell time, the deeper the penetration of the thermo softenable material into the base material, or the greater its sidewise creepage; but the greater the density (i.e., the lesser the porosity) of the base material, the greater the thickness of the integument, and the greater the softness of support in the press, the lesser the penetration or sidewise creepage.

Figure 14:
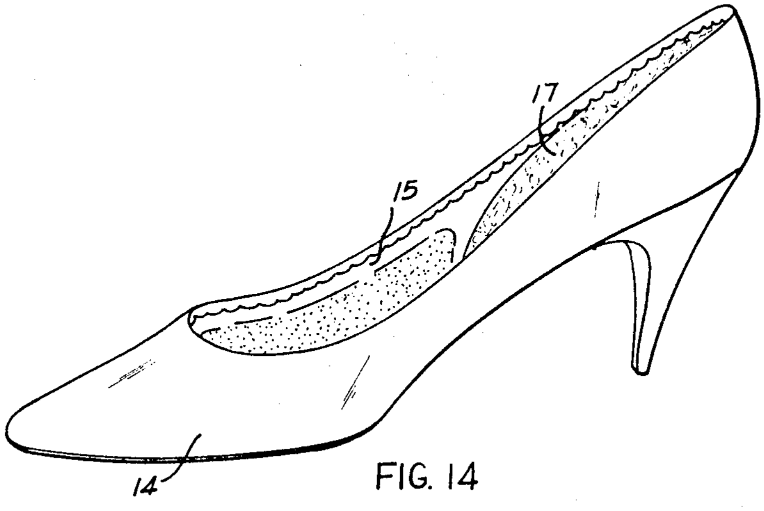
FIGURE 14 is a perspective view of a shoe like that shown in FIGURE 1, but modified to show the adaptability of the invention to the manufacture of shoes which are substantially unlined.
Figures 15, 16, 17:
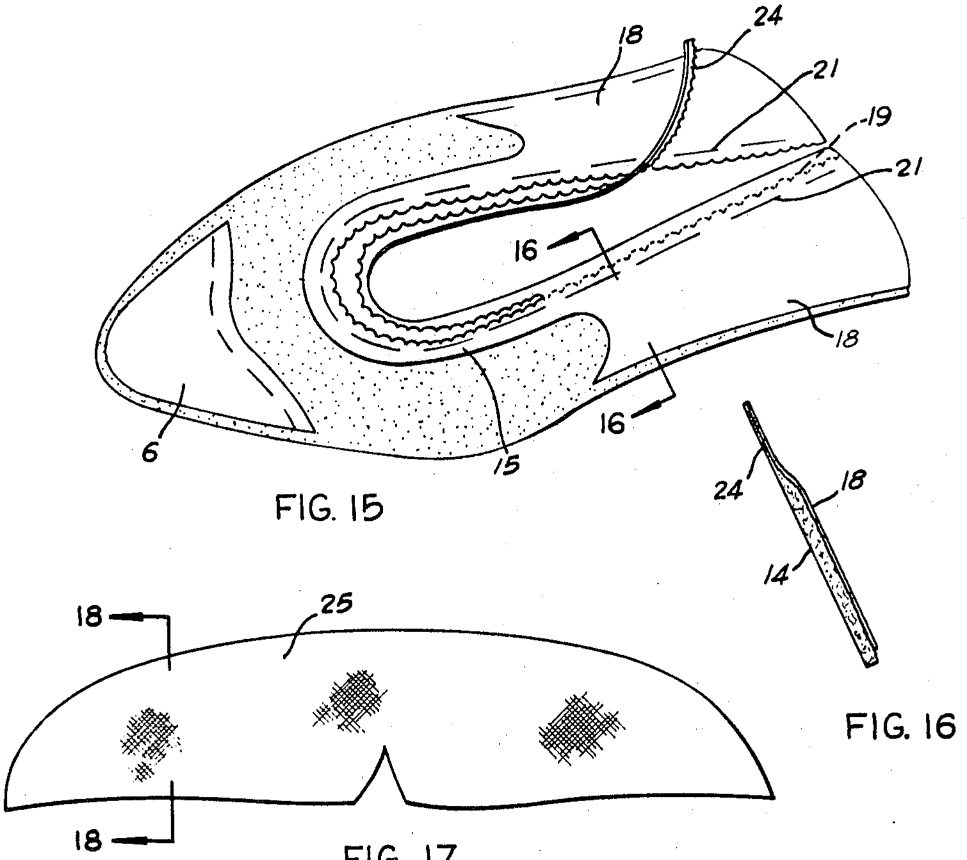
FIGURE 15 is a plan view, partly in perspective, showing the interior of the outside upper of the shoe shown in FIGURE 14.
FIGURE 16 is a sectional view taken along line 16—16 of FIGURE 15.
FIGURE 17 is a plan view of a stiffened counter pocket blank for use in the shoe shown in FIGURE 14.

In the form shown in FIGURE 14, the shoe is unlined, and has an outside upper 14 shown in the form of a long vamp or one-piece outside upper. Some of the internal components are visible, as, for example, the top line reinforcing 15 and counter pocket 17. The upper 14 of the shoe is shown in FIGURE 15 in unclosed position with the inside of the upper exposed to view. An integument 6 is applied as a toe stiffener, as previously described in connection with FIGURE 2, save that it is here applied and integrated with the outside upper rather than the lining. Another integument 18, consisting of two extremity portions corresponding generally to the respective quarter sections of the shoe and interconnected by an integral strip which extends about the throat and sides of the foot opening, so as ultimately to constitute the top line stiffener 15, are integrated in the flat with the outside upper by means of heat and pressure as aforesaid. Thereafter, the margin of the integument 18, as well as the underlying feathered edge 24 of upper 14 which extends about the foot opening margin of the upper, is trimmed away to leave a scalloped edge. Such a trimming operation is shown partially complete in full lines in FIGURE 15, and intended to be completed along the dotted line 19, so as to leave a scalloped border extending outwardly of the utlimate top line 21.

After the trimming operation, the margin of the integument 18 is folded inwardly along line 21 shown in FIGURE 20, so as to produce the result shown at 23 in FIGURE 19, and after being so folded, with or without preheating, is again subjected to heat and pressure in order to unify the inturned margin with itself along and below the ultimate top line of the shoe, as shown in FIGURE 14.

Figures 19, 21:
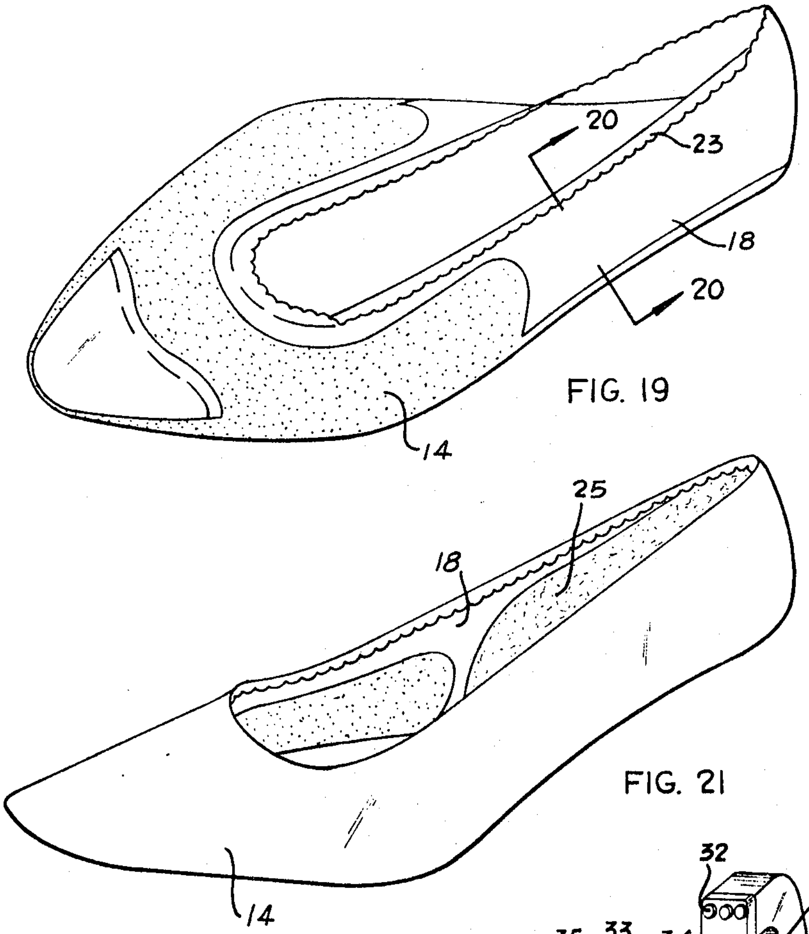
FIGURE 19 is a perspective view of the interior of the upper shown in FIGURE 15 after being closed.
FIGURE 21 is a perspective view taken from the exterior of the upper shown in FIGURES 15 and 19 after assembly with the stiffened counter pocket shown in FIGURE 17.
Figure 20:
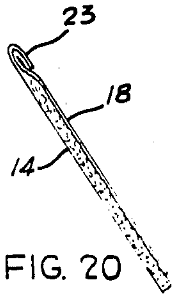
FIGURE 20 is a sectional view taken along line 20—20 of FIGURE 19.

The upper 14, with its integrated integument 18, may be closed as shown in FIGURE 19, either before or after the margin of the integument has been infolded and secured to itself, as previously described, and, if desired, counter pocket 17 may then be applied over at least part of the portions of integument 18 which were located in the quarter regions of the upper, as shown in FIGURE 21.

In carrying out the manufacturing procedure as just described, it is preferable to skive the edge of the upper along the top line prior to application of the integument 18, so that after the integument is applied, but before the integument is trimmed to produce the scalloping, the cross-section along line 16—16 is as shown generally in FIGURE 16, it being noted that the leather of upper 14 extends as a thinner layer 24 adjacent the margins of the integument.

The scalloping or pinking, as shown in FIGURES 14 and 15, of the integument and/or skived margin of upper 14 not only decorate, but make unnecessary the usual nicking of the materials in order to fold them around the curve at the throat portion of the vamp.

The turning and securing of the pinked margin of integument and upper may be accomplished in a conventional thermo-folding machine where the heat softens the integument sufficiently to cause it to stick to itself when folded.

Figure 18:
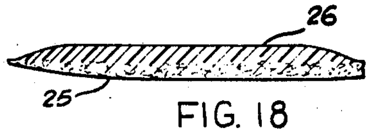
FIGURE 18 is a sectional view taken along line 18—18 of FIGURE 17.

The next operation is to apply the counter. A suitable counter member is shown in FIGURES 17 and 18, and consists of a lining 25 with an integument such as 26 integrated therewith, as shown in FIGURE 18. The counter member 25–26 is brought into the desired correlation with, and on the interior of, the back of the closed upper. Heat is subsequently applied to this portion of the upper, so that the integument 26 adheres to the contiguous parts of integument 18, making unnecessary the utilization of stitching operations or extraneous adhesives to secure the counter in position.

Another way to achieve the desired stiffness in apparel is to treat a conventional fibrous intermediate filler member, such as a "doubler" in a shoe, and impregnate it by the application, on both sides, of integuments of the character aforesaid having a thickness of, say, 0.020".

After the upper work is completed as above described, whether in accordance with the embodiment shown in FIGURES 1 through 5 and 9, or in accordance with the embodiment shown in FIGURES 14 through 21, the upper is lasted in any conventional way. Heat is applied either prior to or during the bed lasting operation in order to soften the embedded integument in either or both of the toe portion and the back portion of the upper, so as to conform the same to the contour of the last. If desired, such parts of the shoe may be further heated during the conventional process of heat setting. The latter consists of exposing the lasted shoe in an appropriate chamber to moisture-saturated air at a temperature of about 200° F. for about one minute, and then transferred automatically to another chamber where it is exposed to dry hot air at a temperature of 260° to 300° F. for about three minutes. This moisture treatment renders the leather more heat conductive, and hence enables reduction of the hot air treatment to a period less than that which would damage leather. The hot air treatment relaxes stresses in integuments made of so-called thermoplastics, finally "sets" integuments made of "B-stage" materials, and in either case may also promote lamination between integument material and contiguous layers which latter, if leather, or other material which shrinks, exerts force tending to drive the layers together.

If heat setting equipment is not available, or not considered desirable, other forms of heating will provide the same effect. For example, lining pressing machines and top-line formers can relieve stresses or set the integument materials. As long as the integument internally reaches the temperature of around 200°, it will relax its former shape and assume the desired curves regardless of the manner in which the heat is applied.

It will be understood that, in the pressing and heating operations, any suitable provision may be made to inhibit adherence of the integuments to areas of the base, or other layers of material where adherence is not desired, or to equipment parts. For example, those areas of the materials or equipment parts with which the integuments are likely to make contact while sticky may be coated with release agents, or other materials to which the integument will not adhere. For example, there are available various silicone and Teflon products which serve such purpose. Furthermore, it is often desirable to provide means for moving the work automatically, or under manual control, into and out of the apparatus which applies heat, pressure, or both, and, in some circumstances, it is desirable to integrate long lengths of integument with long lengths of other materials as a more or less continuous operation. Typical embodiments of such apparatus are shown in FIGURES 22, 23, 24, and 27 which will now be described.

Figure 22:
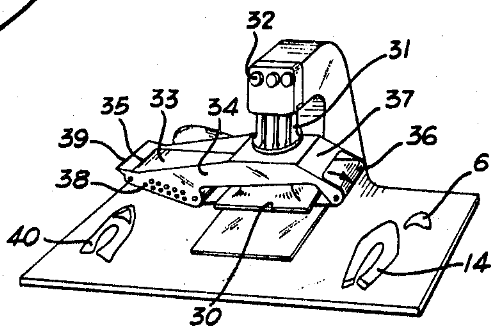
FIGURE 22 is a perspective view of a modified form of pressing equipment utilizable in accordance with the present invention.

In the form shown in FIGURE 22, a press is shown, having a heated head plate 30, which is vertically reciprocable by the application of fluid pressure to a piston located within cylinder 31. The press is preferably provided with any suitable form of manually settable, but automatically operating, controls 32 for regulating the temperature, pressure and dwell time of the press. Mounted on the head 30, for movement up and down with it, is an endless belt, preferably made of, or at least coated with, material to which the integument will not adhere. The belt 33 extends through a housing 34 and about rollers not seen, but located, respectively, at ends 35 and 36 of the housing. The belt 33 is driven in the direction shown by the arrow adjacent end 36, and is preferably indexed to move a predetermined increment with each reciprocation of head 30, either automatically or under manual control. Generally speaking, the movement of the belt 33 with each stroke of head 30 will be approximately equal to the width of head 30. The housing 34 is provided with a heating chamber 37 above head 30, and so arranged as to heat both belt 33 and head 30. Thus the belt 33 is preheated before it comes into contact with either the integument material or the active face of head 30. Such preheating is not essential but, in many cases, does speed the operation and permit a shorter dwell period during which pressure is applied.

From beneath head 30, the belt 33 travels toward and beneath a cooling zone 38 equipped with any suitable means for cooling the belt, and whatever else may travel with the belt. Thus, while integument 6 may adhere to the belt 33 while it is subject to pressure of head 30, and may move with the belt toward cooling zone 38, its temperature will be reduced as it travels adjacent the cooling zone toward a stripping blade 39, by means of which the integument, if still adhering to the belt, is readily stripped from it. To illustrate the operation of the press shown in FIGURE 22, a long vamp upper 14, such as that shown in FIGURE 15, may have an integument 6 applied to it in a position such as to provide for toe stiffening. The integument 6 is superimposed upon the toe area of the vamp 14, and while held in proper position, is disposed beneath head 30 of the press. The press is then actuated to subject the integument 6 to heat and pressure for the desired period of dwell. Upon release of the press, the integument 6 will have become integrated with the area of vamp 14 which it overlaid, and may also temporarily stick to belt 33, but the movement of belt 33 adjacent cooling zone 38 relaxes the adherence so that the composite article may be stripped by blade 39 and dropped into the position shown at 40.

It is preferable to drive the belt 33 with a step-by-step movement which carries the work from beneath head 30 to a position beneath cooling zone 38, and then stops while the press goes through another pressing cycle with a different piece of work. Thus during the dwell time of the press for one piece of work, the previous piece of work has been sufficiently chilled adjacent the cooling zone to thoroughly set the integument. And during the same dwell period, the next increment of belt 33 is being pre-heated in chamber 37.

The belt 33 may, if desired, be adapted to perform functions other than conveying, as, for example, if it is provided with a very smooth polished surface, the pressing operation will impart to the integument a shiny, patent-leather look. Alternatively, the belt can be made with a mat surface or a moire or a fabric texture surface, a leather grain surface, or any of a wide variety of treatments which are embossed in the integument for decorative purposes.

Figure 23:
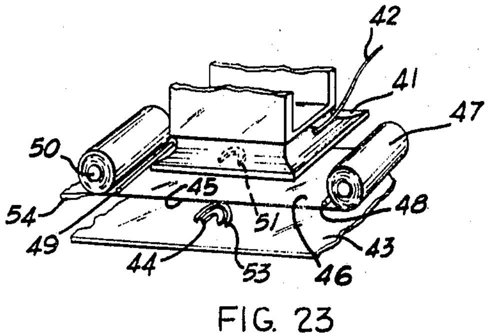
FIGURE 23 is a perspective view of another form of heating and pressing equipment, with some parts broken away to better reveal the interior construction.

The form of pressing apparatus shown in FIGURE 23 is adapted to emboss sections of integument from a continuous strip where it is associated with a carrier film upon an apparel part, such as shoe upper part 14 as shown in FIGURE 2. In the form shown in FIGURE 23, the pressing head 41 is mounted for vertical reciprocation comparable to that shown in FIGURE 22, and is provided with an electrical heating element energized through conductors 42. The apparatus is also equipped with a bed plate 43, which is preferably also vertically reciprocable. Mounted on bed plate 43 is a base die 44, the peripheral contour of which corresponds to the area of integument comparable to 6 in FIGURE 22, which is intended to be applied to a work piece such as 14 in FIGURE 22. Mounted for movement between the head 41 and the base plate 43 is a continuous length of integument 45 on a carrier film 46. The integument 45 is a thermosensitive plastic of the character previously described, but provided in a strip of great length wound upon a reel 47 in association with carrier strip 46. The carrier strip 46 may be a thin film on the order of 0.001 to 0.002 inch thick, and made of a heat-resistant material, such as polyester film known commercially as "Mylar." The integument strip 45 and the carrier strip 46 may be preconnected together by the application of pressure, so that the two travel together, but are not firmly adhered to each other. As the composite strip 45–46 travels from reel 47 between head 41 and base plate 43, it passes under a hold-down member 48 at one side of the head, and a hold-down member 49 at the opposite side of the head, to a take-up reel 50, which is driven in rotation so as to maintain the span of composite strip 45–46 between the two hold-down members 48 and 49 under slight tension.

Figure 24:
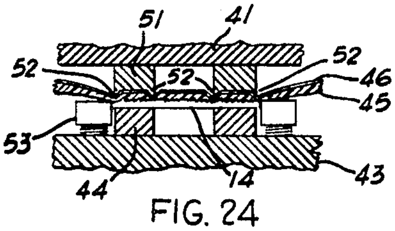
FIGURE 24 is a view showing, in section, the relationship of the press parts and the materials being operated upon while in the press shown in FIGURE 23.

The head 41 is equipped with an embossing die 51, the peripheral contour of which corresponds with the peripheral contour of base die 44, but unlke base die 44, the face of embossing die 51 is routed out to provide a continuous ridge 52 about the margin of the face, as clearly shown in FIGURE 24.

The base plate 43 is also equipped with a guage 53, the contour of which approximately matches the contour of the work piece adjacent which the integument is to be integrated.

An appropriate work piece, such as the shoe upper member 14 shown in FIGURE 22, is brought into position between the die parts 44 and 51, while in their separated position, as shown in FIGURE 23, with the toe end of the work piece internested with guide 53 to properly position it with reference to base die 44. Thereupon the apparatus is actuated to bring the base plate 43 toward head 41, and to bring head 41 toward base plate 43, concurrently. During such movement of the head and base plate, the composite film 45–46 is pressed toward the work piece 14 overlying base die 44, and the parts pressed together, as shown in FIGURE 24. The pressure is maintained at a magnitude, and for a time sufficient, to integrate that portion of integument 45 with that portion of work piece 14, which portions are embraced by die parts 44 and 51. In the pressing operation, the ridges 52 of the embossing die pinch the composite film 45, as shown in FIGURE 24, about the peripheral outline of the desired shape for the integument swatch which is integrated with work piece 14. This pinching action does not necessarily cut the embraced portion of integument strip 45 from the body thereof, but weakens it to the point where the pinched outline permits ready tearing of the body from the strip. When the die parts 44 and 51 have been held together for the requisite period of time to accomplish the integration of the integument with the work piece, head 41 and base plate 43 are separated from each other; the composite strip 45–46 moves toward take-up reel 50, so that work piece 14 passes beneath a stripper blade 54 while the body of the composite strip 45–46 is being wound on reel 50. The stripper blade thus separates the work piece and its integrated integument swatch from the body of composite strips 45 and 46, so that the apparatus is now ready for the reception of a new work piece and a repetition of the cycle just described. It is not essential that the base plate 43 and the head 41 both be vertically movable. Vertical movement of either will suffice, but in situations where one, but not the other, is vertically moved, a flexing of composite strip 45 and 46 out of the rectilinear condition shown in FIGURE 23 will occur and must be tolerated.

Figure 27:
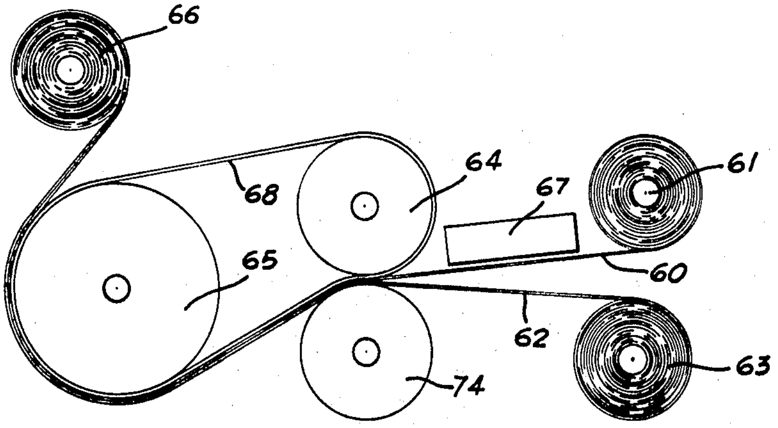
FIGURE 27 is a diagrammatic illustration of an apparatus suitable for unifying long strips of basic apparel material with integument in a substantially continuous operation.

In FIGURE 27, there is illustrated diagrammatically an apparatus for integrating a long strip of integument, of the character aforesaid, with a correspondingly long strip of leather, or other base apparel material, as a continuous operation. In the apparatus shown, a long strip of integument material 60 is provided in the form of a reel 61, while a long strip of leather, or other base apparel material, 62 is provided in the form of a reel 63. The strips 60 and 62 are drawn from their respective reels through the nip of two pressure rolls 64 and 74, and thence about a roll 65 to a take-up roll 66 for the integrated strip. Between roll 61 and roll 64, a heater 67 is provided for locally elevating the temperature of strip 60 to render it flowable when subjected to pressure which is applied when strips 60 and 62 converge at the nip of rolls 64 and 74. Roll 65 is provided with cooling means to solidify the previously softened integument of strip 60. In order to prevent adhesion of the softened integument material 60 as it passes about rolls 64 and 65, an endless belt 68 passes about those rolls in order to prevent direct contact with the rolls of the softened integument material. The belt 68 is preferably made of a material to which the softened integument material does not readily adhere, such as Mylar or Teflon. If desired, the belt 68 may be embossed with any ornamental design which it is desired to transfer to the integument, increment by increment, as the integument passes between rolls 64 and 74 and about roll 65, or even for coating or printing on the integument.

Figure 25:
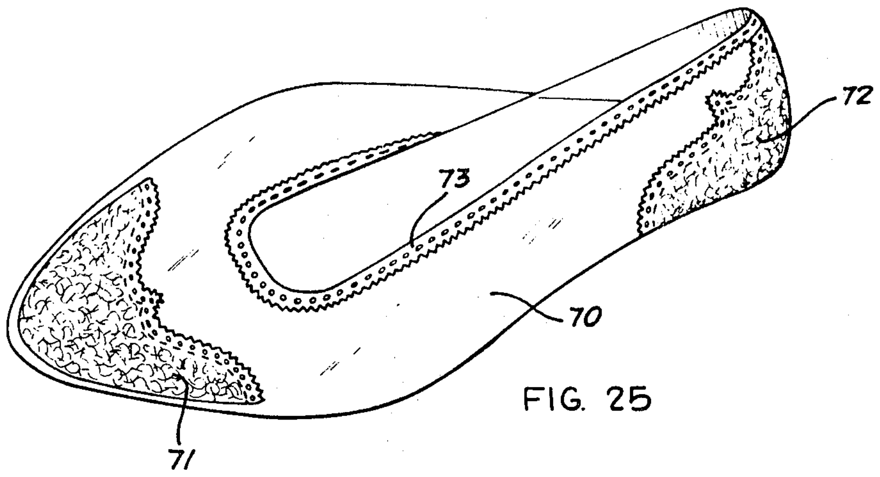
FIGURE 25 is a perspective view of the exterior of the shoe upper showing the adaptation of the present invention to the application of ornamental reinforcing and stiffening integuments on the exterior of the outside upper.

Referring now to FIGURE 25, there is illustrated an outside shoe upper, in the form of a long vamp upper, to which integuments of the aforesaid material are applied on the exterior for stiffening, for decorative purposes, and for improving the wear resistance or scuffing in local areas. In the form shown, an outside shoe upper part 70 is provided with an integument 71, having the contour of a toe stiffening element or tip which, in the form shown, is embossed as by means of the apparatus shown in FIGURES 23 and 24, or by precutting, pinking and perforating the integument, and then applying it as by means of the apparatus shown in FIGURE 22. The upper 70 is also provided with a foxing 72, likewise shown as embossed, which may be prepared and applied in the manner described above wtih reference to tip 71. Additionally, the upper 70 has applied to it a decorative top line reinforcement 73 on the exterior thereof, which again may be prepared and applied in the same manner as described above in connection with tip 71 and foxing 72. Obviously, if desired, all three integuments 71, 72 and 73 may be applied to the exterior of upper 70 simultaneously in one heating and pressing operation.

Figure 26:
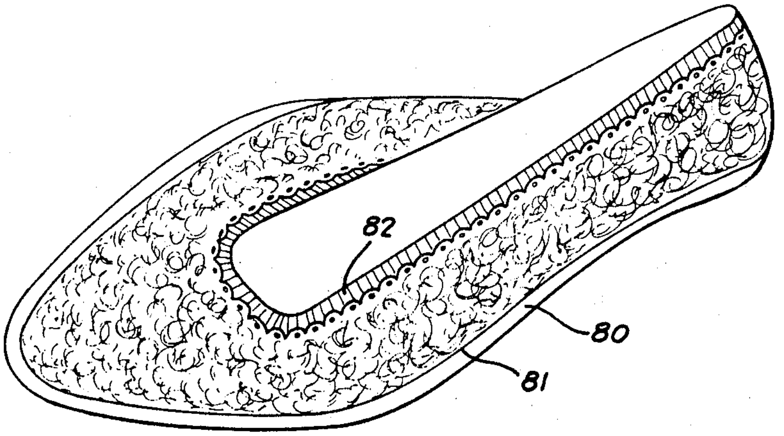
FIGURE 26 is a view corresponding to FIGURE 25, but showing a variation of the technique illustrated in FIGURE 25.

FIGURE 26 shows a further form of treatment, adapted particularly to the manufacture of outside upper parts 80 from relatively less expensive materials than the usual upper leather. For example, the base material of the long vamp outside upper shown may be made of a leather split, felt, or fabric, and have applied thereto, by means such as that shown in FIGURES 23 and 24, an integument 81 which covers the entire exterior surface of upper part 80, save for the lasting allowance. In the form shown, the integument is embossed to resemble the finish on any chosen type of leather, but, if desired, to produce a surface resembling that of patent-leather, a pressure member having a smooth polished surface for contact with the integument may be employed in the integrating operation. In the form shown, the outside upper is provided with a decorative collar or top line reinforcement 82 which, if desired, can be produced by embossment concurrently with the embossing of the balance of the integument, or, if desired, the collar 82 may be prepared as a separate piece and applied in the position shown either before or after the primary integument 81 (which covers substantiallly the entire exterior surface of upper part 80) is applied to the base material.

From the foregoing description, those skilled in the art will readily recognize that the invention accomplishes its objects, and provides a method of treating base materials for apparel, so as to achieve improvement in physical properties, as desired, either at localized areas of an article of apparel, or throughout the entire exposed surface, or throughout the entire concealed surface. The techniques hereinbefore described have the particular advantage of making it possible to control, within extremely narrow limits, the volume of plastic stiffening materials per unit of area of the base material with which they are integrated. For example, the application of the integument material as a solid makes it relatively simple to determine the volume of integument material by calculating the area of a given swatch and multiplying the area by the thickness of that swatch. Since the present invention contemplates that the integument be applied as a solid, this eliminates from consideration many variables which must be taken into account if plastic stiffening or reinforcing materials are applied in liquid form. In contrast with the liquid form, the solid integument materials contemplated by this invention suffer inconsequential change in volume as a result of variation in ambient temperature within the limits normally encountered in manufacturing operations, whereas the liquid form does suffer wide variations. Moreover, the application of the plastic materials in the form of a solid integument makes possible the application of pressure to the integument in order to drive the flowable material into the interstices, and about the fibers of base material, whereas in the case of stiffening agents applied in liquid form, the application of substantial pressure is impossible until after the plastic material has distributed itself in accordance with the natural porosity of the base material, which varies from increment to increment throughout a given area. The latter results in great irregularity of the quantity of impregnation from increment to increment of the base material, whereas when, in accordance with the present invention, the plastic material is applied as a solid and subjected to concurrent heat and pressure, the uniformity with which the impregnation takes place is remarkably uniform from increment to increment of the base material. Consequently, the present invention enables the desired minimum stiffening or reinforcing to be accomplished with a lesser volume of plastic material than could be accomplished by the previous practices.

Furthermore, the techniques of the present invention makes it possible to concurrently stiffen, or otherwise improve, the physical properties of base materials concurrently with securing two or more parts together by means of the adhesive action of the integument while under heat and pressure, and with the assurance that when the pressure has been relieved, there will be little or no tendency for the separate parts to migrate relative to each other.

Moreover, the concepts of the present invention make is possible to apply the thermo-sensitive integument to the whole, or to selected local areas, of an apparel part prior to its assembly with another apparel part, and then thereafter to subject the assembly to heat and pressure, so as to secure the two assembled parts together by integument adhesion. Such integuments may be applied to one or both sides at corresponding, or different local areas of an apparel part which intervenes two other parts, and thereby achieve adhesion between the intervening part and one adjacent part at one area, while adhesion is achieved with another adjacent part at another area, or adhesion achieved with both adjacent parts in the same area, as the circumstances may dictate, all in a single heating and pressing operation.

The present invention also makes it possible to provide lamination of the several components or layers comprising the shoe, or other apparel, in a flat surface, or in contour, such as that provided by a last or pressing forms with the edges of greater shape retention when laminated in contour with a minimum of thickness or bulk. In many cases, it is possible to eliminate the need for stitching because of the bonding properties of the laminations, and because of the material's ability to finish surfaces, it is often possible to eliminate edges finishes, such as folding, binding, or facings. It is also possible, with this invention, to provide transparent temporary reinforcing or supporting edges around openings in shoes, or other apparel, which provide dimensional stability during forming operations, but which can be readily removed from the openings by cutting out, without leaving frayed edges or unwanted colorations. It is also possible, by this invention, to incorporate additional fiber in selected areas for the purpose of greater stiffening at selected points by pre-impregnating fibrous material with integument on both sides of the the fibrous member, and then applying the fiber-containing-integument in exactly the same way as an homogenous integument.

While the specific embodiments hereinbefore disclosed and shown in the accompanying drawings appertain to shoes and their manufacturers, such is not to be understood as limiting the invention to shoes, but, on the contrary, it is to be distinctly understood that the invention in its various forms, applications, and adaptations, is applicable to the manufacture of apparel at large. While several embodiments of the techniques contemplated by the present invention have been disclosed in detail, and a number of appropriate integument materials have been suggested, such is not intended to connote that the invention is limited to the details of the techniques or materials hereinbefore specifically explained, but, on the contrary, that such specific disclosure is merely for the purpose of illustrating the invention and demonstrating its wide range of variation and adaptation.

Having thus described the invention, what is claimed and desired to be secured by Letters Patent is:

1. In the art of applying thermo-softenable plastic to selected areas of apparel made of porous material, the method of controlling the depth of penetration of said said selected area which comprises, providing said plastic as a solid integument of shape and size substantially corresponding with the shape and size of said selected area, aligning said integument with said selected area, and while so alinged subjecting the same to heat and pressure sufficient to drive at least a substantial amount of the integument material into the pores of said porous material at said selected area.

2. In combination with the method of claim 1, the method of controlling the depth of penetration of said plastic into said porous material which comprises providing a press having a head and an anvil movable relative to each other, and regulating the hardness of one of said head and anvil in accordance with the rule that the greater the hardness the greater the penetration.

3. In combination with the method of claim 1, the method of preventing the plastic from striking through the porous material which comprises, applying said heat and pressure while the side of said porous material opposite the integument is contiguous with a pad which is softer than said porous material.

4. In shoemaking, the method of stiffening selectively localized areas of an upper while areas thereof where great flexibility is desired remain in their comparatively soft or loose state, which comprises, providing a first swatch of sheeted solid thermo-softenable plastic, providing a second swatch of sheeted upper material having interstices penetrable from at least one face thereof, said second swatch having an area substantially greater than said first swatch and including a selectively localized area, positioning said first swatch upon said selectively localized area of said one face of the second swatch, and, while so positioned:

(a) subjecting the first swatch to heat sufficient to render it flowable under pressure; and (b) while said first swatch is so heated, selectively applying mechanical pressure to the first swatch and to said selectively localized area of the second swatch, said pressure being in such direction, for such duration, and of sufficient magnitude to drive the flowable first swatch, at least in substantial part, into interstices of the second mentioned swatch which are contiguous with said first swatch.

5. The method of claim 4 wherein the first swatch has a peripheral contour corresponding substantially with the bounds of one of said selectively localized areas, the second swatch is an upper part which embraces said one of said selectively localized areas, and the first swatch is superimposed upon the selectively localized area of the second swatch.

6. The method of claim 4 wherein the first-mentioned swatch is an elastomeric thermoplastic.

7. An article of apparel composed of base material which is fibrous and porous, an integument of thermo-softenable elastomeric plastic material, said integument having:

(a) obverse and reverse faces, said reverse face having radiciform anchorages extending into the pores of said base material; and (b) a periphery circumscribing substantially less area than that of said base material;

and the fibers of said base material inwardly of said periphery being bound in sufficiently more compressed conditioned than those outwardly of said periphery that the periphery of the obverse face of said integument has a substantially smooth junction with the surface of the outwardly adjacent base material.

8. The combination of claim 7 wherein the article of apparel is a shoe, the base material is at least one of:

(a) an external member of a shoe upper; and (b) a lining member of a shoe upper;

and said integument is disposed to reinforce at least one of:

(c) the toe portion;

(d) the quarter portion;

(e) the top line portion;

of the shoe upper member.

9. In the manufacture of an apparel part from base material which is fibrous and porous, the process of selectively stiffening a localized area having at least part of its periphery within the whole area of base material of such apparel part, which comprises: providing a swatch of solid thermo-softenable plastic, providing a film of material which is substantially non-adherent to said thermo-softenable plastic, covering said localized area with said switch, contacting the swatch with said film, heating the swatch through said film to render the swatch flowable, and, while the swatch is flowable, selectively applying mechanical pressure through said film at said localized area to squeeze said swatch toward said base material, said mechanical pressure being sufficient in amount and maintained for a time sufficient:

(a) to drive the flowable thermo-softenable plastic into the pores of the base material within said localized area, and (b) to compress the fibers of said base material within said localized area and to bind such fibers in compressed condition so that the surface junction between the swatch material and the base material at said periphery is thereafter substantially smooth, and thereafter removing said film.

10. The process of claim 9 wherein the swatch is precut to a peripheral contour substantially corresponding with that of said localized area.

11. The process of claim 9 wherein the swatch is of greater area than said localized area, and the mechanical pressure is applied with a die having a pinching edge whose periphery corresponds substantially with the periphery of said localized area.

12. In the art of applying thermo-softenable plastic to selected area of apparel made of porous material, the method of controlling the distribution of said plastic in said selected area which comprises, providing said plastic as a solid integument having an area greater than said selected area, positioning said integument in overlapping relationship with said selected area, and, while so positioned, subjecting the same to heat and to pressure with an instrumentality having a pressure-applying face of shape and size substantially corresponding with the shape and size of said selected area and aligned therewith, said heat and pressure being sufficient to drive at least a substantial amount of the integument material into the pores of said porous material at said selected area.

References Cited

UNITED STATES PATENTS

| | | | |
|---|---|---|---|
| 1,704,299 | 3/1929 | Marsh et al. | 36—58.5 |
| 1,759,034 | 5/1930 | Blair | 36—58.5 |
| 2,191,906 | 2/1940 | Daniels | 12—146 X |
| 2,223,339 | 12/1940 | De Liso | 36—58.5 X |
| 2,390,347 | 12/1945 | Beckwith et al. | 36—77 |
| 2,391,446 | 12/1945 | Cohen | 12—146 X |
| 2,549,985 | 4/1951 | Normington | 161—226 X |
| 3,113,906 | 12/1963 | Hamilton | 36—68 X |
| 2,009,291 | 7/1935 | Ferguson et al. | 36—77 |
| 2,823,157 | 2/1958 | Hofferbert | 161—226 X |

FOREIGN PATENTS

| | | |
|---|---|---|
| 113,128 | 5/1941 | Australia. |
| 963,725 | 7/1964 | Great Britain. |

ALFRED R. GUEST, Primary Examiner

U.S. Cl. X.R.

161—68, 77, 226, 243; 264—257

UNITED STATES PATENT OFFICE

CERTIFICATE OF CORRECTION

Patent No. 3,467,976 September 23, 1969

Gilbert F. Jonas

It is certified that error appears in the above identified patent and that said Letters Patent are hereby corrected as shown below:

Column 1, line 70, "has" should read -- had --. Column 4, line 40, "use" should read -- used --. Column 5, line 22, "as" should read -- an --. Column 6, line 21, "," should read -- . --. Column 10, line 74, "unlke" should read -- unlike --. Column 11, line 3, "guage" should read -- gauge --. Column 12, line 15, "wtih" should read -- with --. Column 14, line 8, "method of controlling the depth of penetration of said" should read -- method of controlling the distribution of said plastic in --.

Signed and sealed this 15th day of September 1970.

SEAL)

ttest:

dward M. Fletcher, Jr.
ttesting Officer

WILLIAM E. SCHUYLER, JR.
Commissioner of Patents